United States Patent

Buiting

[15] 3,636,426
[45] Jan. 18, 1972

[54] MOTOR CONTROL SYSTEM INCLUDING MOTOR PROTECTOR AND REMOTE SENSOR FOR CONTROLLING MOTOR OPERATION

[72] Inventor: Francis P. Buiting, Plainville, Mass.
[73] Assignee: Texas Instruments Incorporated, Dallas, Tex.
[22] Filed: Aug. 25, 1970
[21] Appl. No.: 66,897

Related U.S. Application Data

[63] Continuation of Ser. No. 729,123, May 14, 1968, abandoned.

[52] U.S. Cl. .................................................... 318/471
[51] Int. Cl. ....................................................... H02h 5/04
[58] Field of Search ................ 318/221 R, 221 H, 227, 471, 318/472, 473

[56] References Cited

UNITED STATES PATENTS

| | | |
|---|---|---|
| 2,874,344 | 2/1959 | Slocum .................................. 318/473 |
| 2,930,959 | 3/1960 | Slocum ................................ 318/221.1 |
| 3,079,524 | 2/1963 | Gibson ................................... 318/473 |
| 3,255,397 | 6/1966 | Vaughan ................................ 318/221 |
| 3,290,576 | 12/1966 | Jensen .................................. 318/471 |

Primary Examiner—T. E. Lynch
Assistant Examiner—W. E. Duncanson, Jr.
Attorney—Harold Levine, Edward J. Connors, Jr., James P. McAndrews, John A. Haug and Gerald B. Epstein

[57] ABSTRACT

The control system employs a thermostatic motor protector for controlling a system parameter, such as temperature, at a distance from the motor as well as for protecting the motor. A thermistor is provided having a resistance which varies in response to changes in the value of the parameter. The thermistor is interconnected with a heater associated with the motor protector to cause the protector to deenergize the motor if the value of the parameter exceeds a predetermined threshold.

15 Claims, 5 Drawing Figures

PATENTED JAN 18 1972
3,636,426
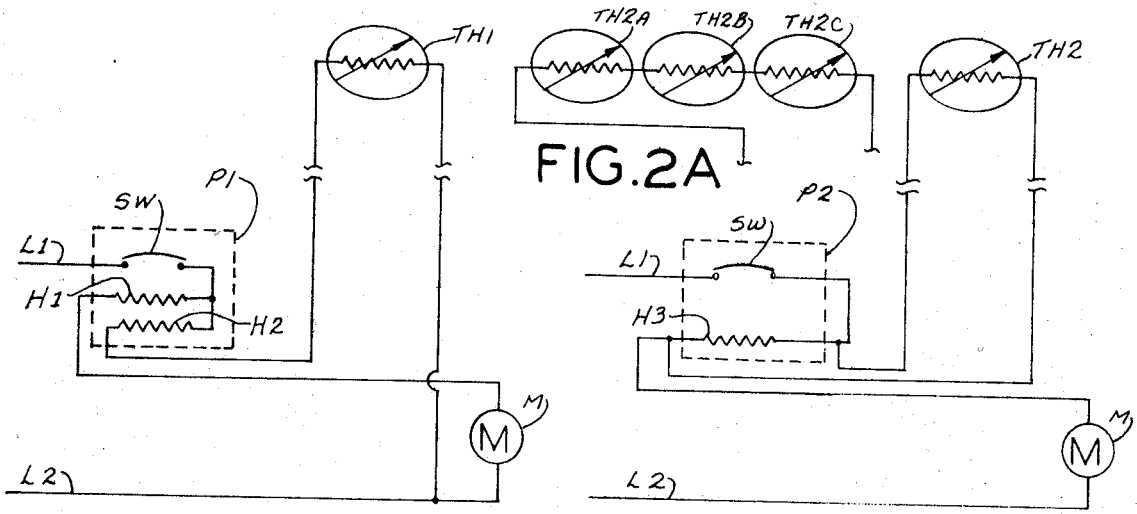
FIG. 1
FIG. 2
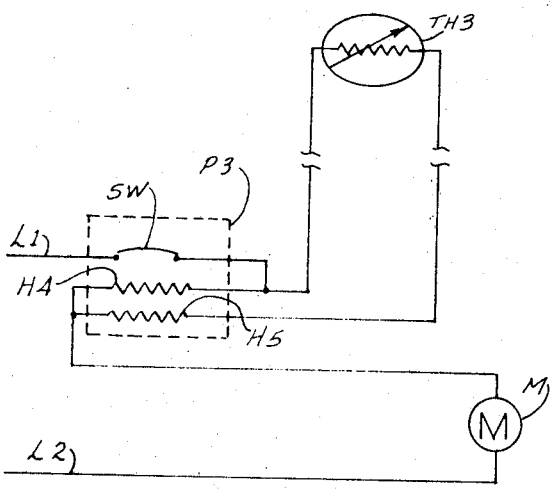
FIG. 3
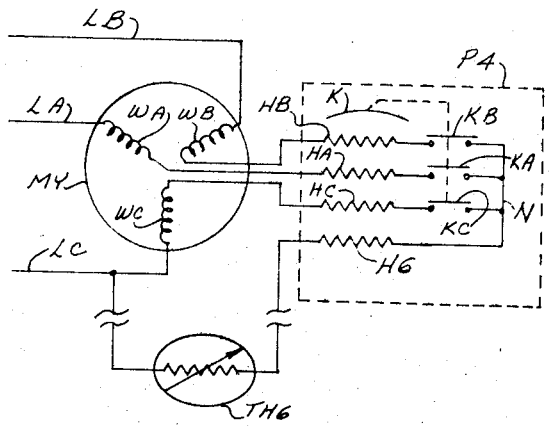
FIG. 4
Francis P. Buiting,
Inventor.
Koenig, Senniger,
Powers and Leavitt,
Attorneys.

MOTOR CONTROL SYSTEM INCLUDING MOTOR PROTECTOR AND REMOTE SENSOR FOR CONTROLLING MOTOR OPERATION

This application is a continuation of Ser. No. 729,123 filed May 14, 1968 now abandoned.

This invention relates to a motor control and more particularly to such a control for controlling the energization of an electric motor the operation of which affects a variable parameter at a distance from the motor.

In typical controls in which a variable parameter is controlled or limited by a control circuit, separate contacts or switching means are provided for motor control and motor protection. For example, the motor itself may be protected by a thermostatic switch embedded in the windings of the motor while the control function is provided by a power-switching relay apart from the motor. Thus, two power-switching mechanisms must be provided.

Among the several objects of the present invention may be noted the provision of a control for an electric motor which employs a single switch means or set of contact for both motor protection and for controlling a variable system parameter; the provision of such a system in which an essentially conventional thermostatic motor protector controls the operation of an electric motor to prevent a system parameter from going beyond a preselected value; the provision of such a system which employs solid-state sensing means; and the provision of such a system which is reliable and which is relatively simple and inexpensive. Other objects and features will be in part apparent and in part pointed out hereinafter.

Briefly, a control according to the present invention is operative to control the energization of an electric motor the operation of which affects the value of at least one variable parameter at a distance from the motor. The control includes a thermostatic motor protector associated with the motor. The protector includes a temperature-sensitive switch for interrupting the flow of current from an electric power source to the motor to deenergize the motor upon overloading thereof and the protector also includes a heater which is in heat exchange relationship with the switch for operating the switch. A thermistor is provided having a resistance which varies in response to changes in the value of the parameter. The thermistor and the heater are interconnected for varying the energization of the heater as a function of the value of the parameter. Accordingly, the motor is deenergized if the value of the parameter crosses a predetermined threshold.

The invention accordingly comprises the constructions hereinafter described, the scope of the invention being indicated in the following claims.

In the accompanying drawings in which various possible embodiments of the invention are illustrated, FIG. 1 is a schematic circuit diagram of a control of this invention in which line voltage is applied across a serially connected thermistor sensor and a thermostatic switch operating heater;

FIG. 2 is a schematic circuit diagram of another embodiment of the invention wherein a thermistor sensor is connected in shunt with a switch-operating heater;

FIG. 2A illustrates a modification of the embodiment of FIG. 2 employing a plurality of thermistor sensors;

FIG. 3 is a schematic circuit diagram of a further embodiment wherein a sensor and its heater are energized from the voltage drop provided across a heater which is in series with the motor windings; and FIG. 4 is a schematic circuit diagram of an embodiment of this invention for use with a three-phase motor.

Corresponding reference characters indicate corresponding parts throughout the several views of the drawings.

Referring now to FIG. 1, there is indicated at P1 an essentially conventional thermostatic motor protector. Protector P1 is associated with a motor M which it is designed to protect and may, for example, be mounted within the motor housing or embedded within the windings of the motor itself so as to be responsive to heat generated therein. The protector includes a thermostatic switch SW which may, as diagrammatically illustrated, comprise a snap-acting, bimetallic disc which cooperates with fixed contacts to break a circuit to the motor when the temperature of the disc exceeds a predetermined level. The protector also includes a first heater H1 which is connected in series with the motor M and the switch SW across a pair of AC supply leads L1 and L2 and which is in heat exchange relationship with the disc. As is understood by those skilled in the art, the heat generated by heater H1 varies as the function of the current drawn by the motor M so that if the motor is stalled or is energized in a locked rotor condition so that overload currents are drawn, the switch SW is quickly heated to its actuation temperature to open the motor circuit thereby deenergizing and protecting the motor M. As is understood by those skilled in the art, the disc itself may be constructed so as to possess sufficient resistance to provide this function by self-heating.

The protector P1 also includes an auxiliary heater H2 which is in heat exchange relationship with the temperature-sensitive switch SW. Auxiliary heater H2 is connected across supply leads L1 and L2 through a circuit which includes the thermostatic switch SW and a sensing thermistor TH1. Sensing thermistor TH1 is located at a distance from the motor and responds to a variable system parameter the value of which is affected by the operation of the motor. As an example of a system in which the present control is useful, the motor M may comprise the blower motor for a conventional hot air furnace. In such systems it is desirable to deenergize the furnace including the motor M if the temperature in the furnace plenum exceeds a predetermined level or threshold. Such overtemperature operation might, for example, be caused by the failure of a drive belt interconnecting the motor M and the blower so that plenum circulation is interrupted even though the motor M itself continues to run normally. The thermistor TH1 is then mounted in the plenum to sense the temperature there and is constructed of a semiconductor material having an NTC (negative temperature coefficient of resistivity) characteristic.

Such a control system then operates substantially as follows. Assuming that the plenum temperature is below the predetermined threshold and that the motor M is operating normally, the heaters H1 and H2 do not generate sufficient heat to bring the switch SW to its operating temperature. Thus the energization of the motor M is maintained. If the motor is overloaded for any reason, the heater H1 generates sufficient heat to raise the temperature of the switch SW so as to actuate it to deenergize the motor in conventional fashion. If the plenum temperature should rise above the predetermined threshold temperature, the resistance of the thermistor TH1 decreases thereby increasing the energization of the heater H2. This increased energization of the heater H2 raises the temperature of the switch SW to a level above its operating point, deenergizing the motor M and shutting off the furnace.

To provide a sharply defined plenum temperature at which deenergization occurs, it is preferable that the temperature-resistance characteristic of the semiconductor material comprising thermistor TH1 have a sharp knee, that is, the material should itself have a threshold temperature above which the resistance of the material decreases relatively abruptly. In this way, a switching-type action is provided which gives a well defined point of deenergization of the motor M.

The resetting of the protector may be either automatic, occurring upon cooling down of the thermostatic bimetal disc, or manual, as is understood by those skilled in the motor protector art.

A similar mode of operation may be provided using a PTC (positive temperature coefficient of resistivity) thermistor as illustrated in FIG. 2. In this embodiment, a protector P2 is employed which comprises thermostatic switch SW and a single heater H3 in heat exchange relationship with the switch, the auxiliary heater being omitted. The heater H3 is connected in series with the motor M across supply leads L1 and L2. However, in this modification, the heater H3 is shunted by a PTC thermistor TH2 which is responsive to plenum temperature.

The characteristics of the heater H3 are chosen so that the normal running current drawn by the motor M will cause that heater to generate sufficient heat to raise the temperature of the thermostatic switch SW to its operating point, provided the heater H3 carries the entire motor current. However, as may be seen from the circuit diagram of FIG. 2, a portion of the motor current is carried by the PTC thermistor TH2. As long as thermistor TH2 is relatively cool, the shunting action provided by the thermistor prevents the tripping of switch SW by the heat generated in heater H3. If the plenum temperature should rise above the predetermined threshold, the resistance of thermistor TH2 increases so that the heater H3 carries substantially the entire motor current and thus the switch SW is operated to deenergize the motor. Thus, substantially the same mode of operation is obtained as in the embodiment illustrated in FIG. 1. Again it is preferable that the sensing thermistor have switching-type characteristics. In other words, it is preferable that the PTC thermistor TH2 be constructed of a semiconductor material having a transition temperature above which the resistance of the material rises relatively abruptly. Such materials are well known in the art and are conventionally employed for self-regulating heaters.

If desired, the single PTC thermistor TH2 can be replaced with a plurality of similar PTC thermistors TH2A, TH2B and TH2C connected in series as illustrated in FIG. 2A. As is apparent to those skilled in the art, an increase in resistance in any one of the three thermistors will have substantially the same effect on the operation of the control as an increase in the resistance of the single thermistor in the embodiment of FIG. 2.

The circuit illustrated in FIG. 3 is useful when it is not desirable to apply the full supply voltage across the sensing thermistor and the heater associated therewith, as was done in the example of FIG. 1. In the FIG. 3 circuit, a remote sensing thermistor TH3 of the NTC type is connected in series with an auxiliary protector heater H5 and the series-connected pair is connected across a main heater H4. The main heater H4 is connected in series with the motor M. The sensing circuit is thus energized by the voltage drop developed across heater H4 by the current drawn by the motor M. It can be seen that the energization of the heater H5 varies not only as a function of the resistance of the sensing thermistor TH3 but also as a function of the motor current since the motor current determines the voltage supplied to the sensing circuit. In many applications, this interaction is desirable in that it is advantageous to have the sensitivity of the sensing circuit increase as the load on the motor M increases.

The present invention may also be applied to a system employing a three-phase motor MY as shown in FIG. 4. The motor MY comprises three windings WA, WB and WC which are arranged in a wye configuration, one end of each winding being connected to a respective supply lead LA, LB and LC. An essentially conventional three-phase motor protector P4 is associated with motor MY. Protector P4 includes three sets of contacts KA, KB and KC and a bimetallic operator K for opening these contacts when the temperature of the operator exceeds a predetermined level. Heaters HA, HB and HC are respectively connected in series with the motor windings and the respective contacts. When the contacts KA–KC are closed they complete the wye connection of the motor windings and establish a neutral terminal or lead as indicated at N. Protector P4 further comprises a heater H6 which is connected in series with a remote sensing thermistor TH6 between one of the supply leads (LC) and the neutral lead N.

As is understood by those skilled in the art, the protector P4 will protectively deenergize the motor MY if anyone of the three windings WA–WC draws an overload current through the respective heater HA–HC. Further, if the temperature of the thermistor TH6 passes a predetermined threshold, which may be either a relatively high temperature or a relatively low temperature depending upon whether the thermistor TH6 is of the PTC or NTC type, the heater H6 is energized and causes the operator K to open the contacts KA–KC thereby deenergizing the motor.

While a hot air furnace has been described as a principal example for the purpose of illustration, it should be understood that other parameters in other systems may be similarly sensed to initiate motor energization or deenergization when the parameter crosses a predetermined threshold. For example, the compressor motor in a refrigeration system can be deenergized if the condenser temperature exceeds a given threshold or if the evaporator temperature falls below a predetermined threshold. It is also understood by those skilled in the art that thermistors operated in a self-heating mode may be employed as flow rate detectors. Thus the sensing thermistor in any one of the embodiments illustrated can be used in a furnace to sense whether a draft is present for the burner or it can be used in a blower system to cause whether there is an obstruction blocking flow. Further, the sensing thermistor can be employed to provide thermostatic control on a sustained basis for an area to which heat or cooling is being provided by the operation of the controlled motor. Many other applications will be readily apparent to those skilled in various other arts.

Similarly, it will be understood by those skilled in the art that a plurality of thermistors may be used in any one of the embodiments illustrated in place of the one thermistor shown if it is desired to sense a plurality of different parameters or if it is desired to sense the same parameter in a plurality of locations. The thermistors may then be interconnected in logical fashion to provide a change in the operation of the motor only upon desired combinations of conditions. For example, various logical gating functions using thermistors suitable for this purpose are illustrated in copending application, Ser. No. 668,509, filed Sept. 18, 1967. Similarly, the operation of the motor can be programmed according to a desired sequence by controlling the heating of the sensing thermistor with electrothermal timing or sequencing apparatus of the type disclosed in copending application, Ser. No. 608,230, filed Jan. 9, 1967. Further, the heaters used herein may themselves be PTC or NTC thermistors to give even greater flexibility in switching as taught by the copending applications, supra.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control for an electric motor the operation of which motor affects the value of at least one variable parameter of a system at a distance remote from said motor, said control comprising:

a thermostatic motor protector including a temperature-sensitive switch for selectively interrupting the flow of current from an electric power source to said motor, said protector including a heater in heat exchange relationship with said switch for effecting operation thereof, said heater being adapted to effect operation of said temperature-sensitive switch in response to overloading of said motor and in response to predetermined changes in the variable parameter in the remote system, a thermistor having a resistance which varies in response to changes in the value of said parameter, said thermistor being disposed at a location remote from said motor, and in thermal communication with the variable parameter; and means interconnecting said heater and said thermistor for varying the energization of said heater as a function of the value of the variable parameter to effect deenergization of the motor when the value of the parameter crosses a predetermined threshold.

2. A control as set forth in claim 1 wherein said thermistor and said heater are connected in series across said electric power source.

3. A control as set forth in claim 2 wherein said thermistor has a negative temperature coefficient of resistivity.

4. A control as set forth in claim 3 wherein said thermistor has a transition temperature above which the resistance of said thermistor decreases relatively abruptly.

5. A control as set forth in claim 1 wherein said protector further includes a second heater, said second heater being in heat exchange relationship with said switch and connected in series with said motor for operating said switch when said motor draws an overload current.

6. A control as set forth in claim 5 wherein said first heater and said thermistor are connected in series across said second heater whereby the sensitivity of said thermistor to variations in the value of said parameter varies as a function of the current drawn by said motor.

7. A control as set forth in claim 1 wherein said heater is connected in series with said motor for operating said switch to deenergize said motor when said motor draws an overload current.

8. A control as set forth in claim 7 wherein said thermistor is connected across said heater.

9. A control as set forth in claim 8 wherein said thermistor has a positive temperature coefficient of resistivity.

10. A control as set forth in claim 9 wherein said thermistor has a transition temperature above which the resistance of said thermistor increases relatively abruptly.

11. A control as set forth in claim 1 wherein said switch comprises a snap-acting bimetal disc.

12. A control for an electric motor the operation of which motor affects the value of at least one variable parameter of a system at a distance remote from said motor, said control comprising:
a thermistor having a resistance which varies in response to changes in the value of said parameter, said thermistor being disposed at a location remote from said motor; and
a thermostatic motor protector including a single temperature-sensitive switch for selectively interrupting the flow of current from an electric power source to said motor in response to overloading of the motor and in response to changes in the resistance of said remote thermistor, said protector including a first heater in heat exchange relationship with said switch and connected in series with said motor for operating said switch when said motor draws an overload current and a second heater electrically coupled to said remote thermistor the energization of said second heater being controlled by the resistance of said remote thermistor, said second heater also being in heat exchange relationship with said switch for effecting operation of said switch in response to predetermined variations in the parameter to effect deenergization of the motor when the value of said parameter crosses a predetermined threshold.

13. A control as set forth in claim 12 wherein said thermistor and said second heater are connected in series across said source.

14. A control for a three-phase electric motor having three windings, the operation of which motor affects the value of at least one variable parameter of a system at a distance from said motor, said control comprising:
a thermistor having a resistance which varies in response to changes in the value of said parameter; and
a thermostatic motor protector including three heaters each respectively connected in series with one of said windings and temperature-sensitive switching means in heat exchange relationship with said heaters for interrupting the flow of current from an electric power source to said windings, said protector including also a fourth heater the energization of which is controlled by the resistance of said thermistor said fourth heater also being in heat exchange relationship with said switch whereby said motor is deenergized if the value of said parameter crosses a predetermined threshold.

15. A control as set forth in claim 14 wherein said switching means connects said windings to a neutral terminal and wherein said thermistor and said fourth heater are connected in series across one of said windings.

* * * * *